United States Patent

[11] 3,626,374

[72] Inventor Thomas Joseph Chinlund
New York, N.Y.
[21] Appl. No. 10,157
[22] Filed Feb. 10, 1970
[45] Patented Dec. 7, 1971
[73] Assignee Bell Telephone Laboratories, Incorporated
Murray Hill, Berkeley Heights, N.J.

[54] HIGH-SPEED DATA-DIRECTED INFORMATION PROCESSING SYSTEM CHARACTERIZED BY A PLURAL-MODULE BYTE-ORGANIZED MEMORY UNIT
1 Claim, 6 Drawing Figs.

[52] U.S. Cl. .......... 340/172.5
[51] Int. Cl. .......... G06f 13/00
[50] Field of Search .......... 340/172.5

[56] References Cited

UNITED STATES PATENTS

| | | | |
|---|---|---|---|
| 3,030,019 | 4/1962 | Smith | 340/172.5 |
| 3,541,518 | 11/1970 | Bell et al. | 340/172.5 |
| 3,303,477 | 2/1967 | Voigt | 340/172.5 |
| 3,359,542 | 12/1967 | Macon et al. | 340/172.5 |
| 3,500,337 | 3/1970 | Womack | 340/172.5 |
| 3,533,077 | 10/1970 | Bell et al. | 340/172.5 |
| 3,440,618 | 4/1969 | Chinlund | 340/172.5 |
| 3,521,237 | 7/1970 | Chinlund | 340/172.5 |

*Primary Examiner*—Raulfe B. Zache
*Assistant Examiner*—Melvin B. Chapnick
*Attorneys*—R. J. Guenther and Kenneth B. Hamlin

ABSTRACT: A byte-organized variable-instruction-length system is modified in a unique fashion to implement the selective access mode of operation. As modified, the system includes a plural-module memory and a plurality of location counters respectively associated with the memory modules. In the selective access mode of operation each module location counter is altered by a different amount, in general, according to information stored in a bank of byte-organized selection registers. The various differently-locked bytes so referenced by the counters are then extracted from the memory to form a multibyte instruction, for data, word.

INVENTOR
T. J. CHINLUND
BY Lucian C. Canepa
ATTORNEY

FIG. 3

MAIN MEMORY UNIT 210

| ADDRESS | 210A | 210B | 210C | 210D |
|---|---|---|---|---|
| THME | LOAD | X1 | 1 | |
| THME+1 | SHIFT | X2 | 3 | |
| THME+2 | NULL | X3 | 7 | |
| THME+3 | ADD | X4 | 8 | |
| THME+4 | SUB | 0 | 12 | |
| THME+5 | STORE | 5 | MASK | MID |
| THME+6 | MOVE | 7 | X1 | END |
| THME+7 | | 10 | X4 | RIGHT |
| THME+8 | | 15 | X18 | LEFT |
| THME+9 | | 20 | COUNT | |
| THME+10 | | 0 | DIGIT | |
| THME+11 | | X2 | LIMIT | |
| THME+12 | | X3 | ERROR | |
| THME+13 | | X7 | SUM | |
| THME+14 | | | BUFFER | |
| THME+15 | | | REGISTER | |
| THME+16 | | | QUEUE | |
| THME+17 | | | HOPPER | |

FIG. 4

ITEM-EXTRACTING SEQUENCE

| | | | | |
|---|---|---|---|---|
| | LOAD | X2 | 8 | |
| ONE-HALF WORD EACH | SHIFT | 7 | | |
| | | | MASK | RIGHT |
| | SUB | 0 | LIMIT | |
| | STORE | X7 | QUEUE | |

FIG. 5

SELECTION REGISTERS

| NO. | | | | |
|---|---|---|---|---|
| 9 | 0 | 1 | 3 | 3 |
| 10 | 1 | 5 | 2 | 4 |
| 11 | 3 | 4 | 6 | 4 |
| 12 | 1 | 3 | 5 | 5 |
| 13 | 0 | 0 | 0 | 0 |

HIGH-SPEED DATA-DIRECTED INFORMATION PROCESSING SYSTEM CHARACTERIZED BY A PLURAL-MODULE BYTE-ORGANIZED MEMORY UNIT

BACKGROUND OF THE INVENTION

1. Field of the Invention

This invention relates to the selective processing of information signals and more particularly to an improved information processing system characterized by a novel mode of operation designated the selective access mode.

2. Description of the Prior Art

Information processing systems must often perform a large number of similar tasks which differ from each other only in requiring a slightly varied sequence of operations or a few changed parameters. In conventional systems it is necessary either to have a distinct subroutine for each such task or else to have a common general subroutine and a distinct calling sequence for each task. If each task is relatively simple, the overhead involved in implementing either of these approaches becomes prohibitive both in terms of storage space and processing time.

Consider, for example, the problem of extracting small amounts of information from words stored in tables in a memory unit. Each such item of information can, for example, be located by specifying a series of pointers, an offset distance in words from the head of a specified table and particular bit locations within a designated word. A typical system for performing such extractions may require a distinct subroutine for each differently located item of information.

Basic selective access systems (as disclosed, for example, in U.S. Pat. No. 3,440,618, issued Apr. 22, 1969, and in may copending application Ser. No. 637,789, filed May 11, 1967, now U.S. Pat. No. 3,521,237, issued July 21, 1970) represent advantageous examples of how to perform the above-specified type of processing in a particularly efficient way. In the selective access mode of operation it is possible to combine or merge certain sequences of instructions into a generalized sequence from which particular sequences may be selected. Subroutine calling overhead is thereby reduced by having compactly encoded selection information specify particular instructions in the generalized sequence.

Despite their advantageous nature, generalized selective access sequences still require a distinct instruction for each different combination of parameters (operation, index tag, address or count) which may be required to carry out the desired processing operation. This realization has led to work directed at trying to compact further the coding required to represent a generalized selective access sequence of the type described above.

SUMMARY OF THE INVENTION

An object of the present invention is an improved information processing system.

A more particular object of this invention is an improved information processing system characterized by an efficient high-speed data-directed mode of operation.

More specifically, an object of the present invention is to modify the information processing systems disclosed in the patents cited above to impart thereto the capability to specify various combinations of parameters without the necessity of encoding every desired combination as a distinct complete instruction.

Briefly, these and other objects of the present invention are realized in a specific illustrative embodiment thereof that comprises a modification of the basic word-organized selective access systems disclosed in the aforeidentified patents. In accordance with the principles of this invention, the basic selective access mode of operation is embodied in a byte-organized variable-instruction-length system. By arranging a byte-organized system to carry out the selective access mode of operation it has been demonstrated that it is possible to achieve a higher degree of compaction of selection information than heretofore realized.

The modified system comprises a main memory unit that is organized into *m* separate modules. In turn, the modules of the memory unit are respectively referenced by *m* location counters which may be either program instruction location counters or address counters. Bytes of selection information stored in a bank of high-speed registers are respectively applied to the counters. In this way the representations contained in the counters are selectively modified by, in general, different amounts. Accordingly, bytes from respectively different word locations or addresses in the main memory unit may thereby be referenced and retrieved. In turn, the retrieved bytes are routed to a storage buffer register to form the constituent parts of an instruction or data word. Subsequently, the word composed in this unique fashion is processed by the system in a conventional way.

It is a feature of the present invention that selection information be utilized to modify the contents of location counters that respectively reference designated modules of a byte-organized memory unit.

BRIEF DESCRIPTION OF THE DRAWING

A complete understanding of the present invention and of the above and other objects, features and advantages thereof may be gained by a consideration of the following detailed description of a specific illustrative embodiment thereof presented hereinbelow in connection with the accompanying drawing, in which:

FIG. 3 represents a generalized routine stored in a portion of a plural-module memory unit included in the system shown in FIGS. 1A and 1B;

FIG. 4 represents a particular item-extracting sequence that the system of FIGS. 1A and 1B is adapted to carry out; and FIG. 5 symbolizes the indications stored in five particular selection registers included in the illustrative system.

DETAILED DESCRIPTION

Figure 1A:
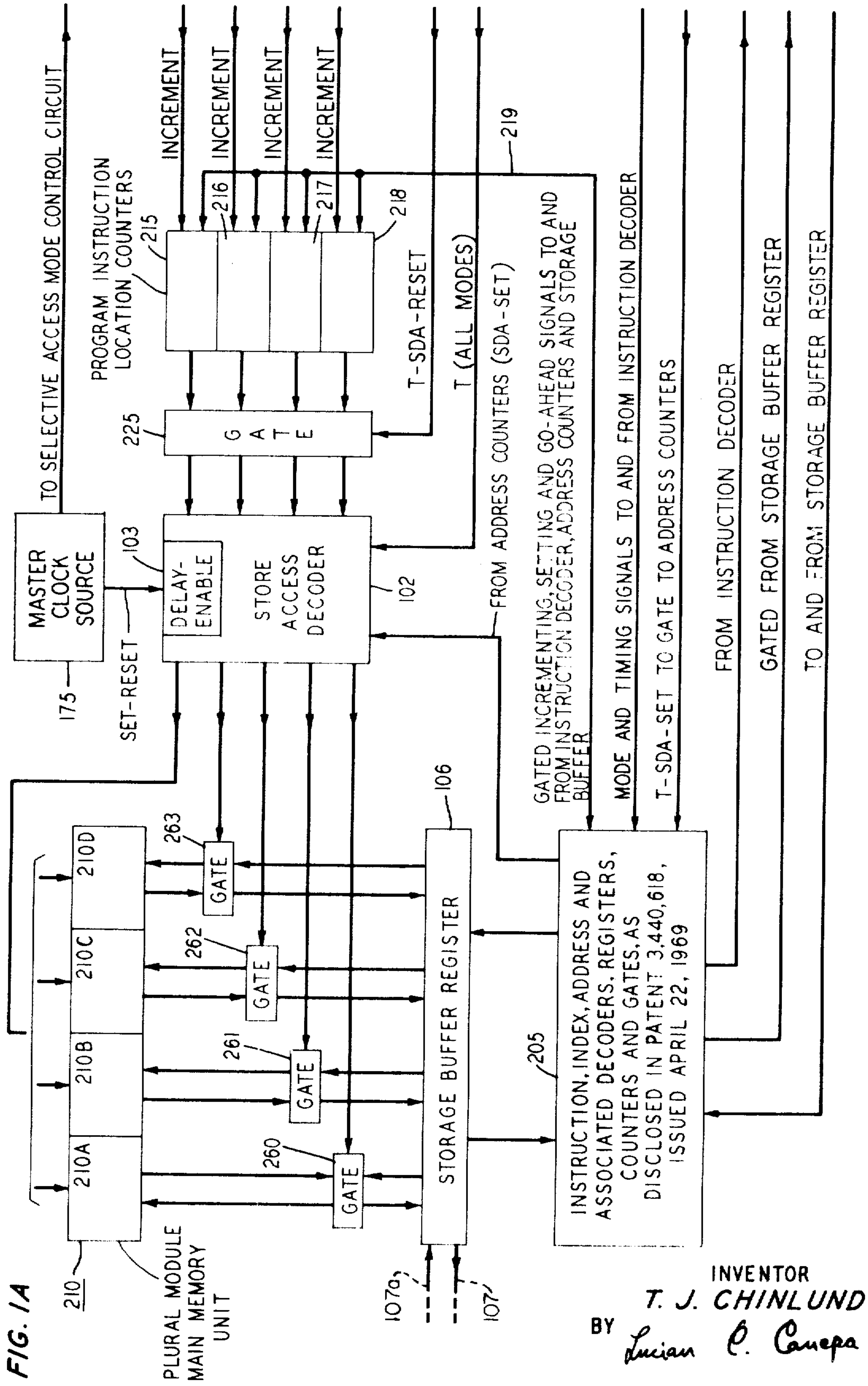
FIGS. 1A and 1B, when placed side by side in the manner indicated in FIG. 2, depict a specific illustrative information processing system made in accordance with the principles of the present invention.
Figures 1B, 2:
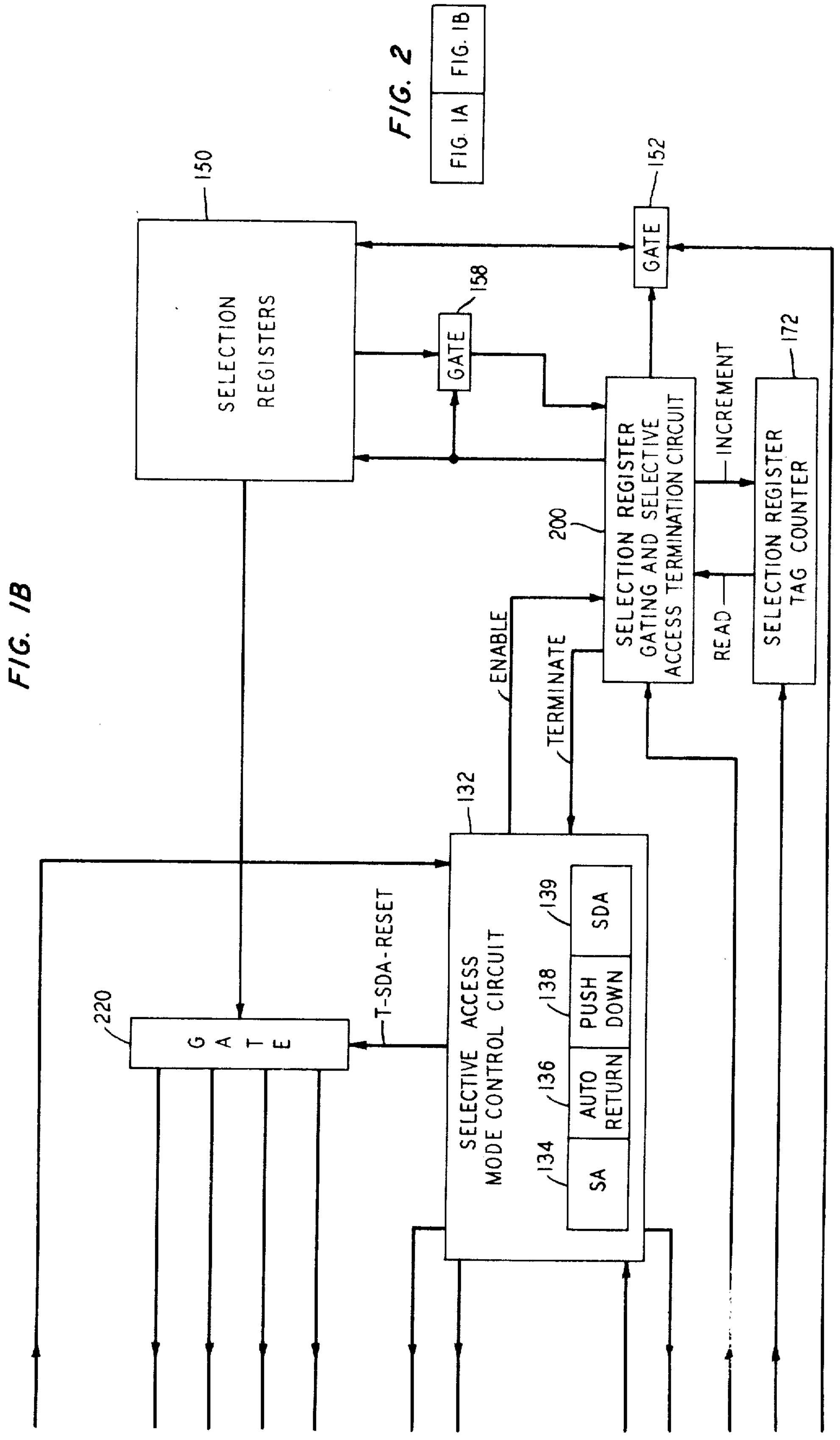

A number of the component blocks included in the system shown in FIGS. 1A and 1B may advantageously be identical to the correspondingly labeled and numbered blocks disclosed in the aforeidentified patents. In FIG. 1A, these previously disclosed blocks comprise a store access decoder 102 which includes a delay-enable flip-flop 103, a storage buffer register 106 and a master clock source 175. In FIG. 1B, these previously disclosed components comprise a block 150 which represents a plurality of high-speed fast-access selection registers, a selection register tag counter 172 and a selective access mode control (SAMC) circuit 132 that includes four indicators: a selective access (SA) flip-flop 134, an automatic return flip-flop 136, a pushdown flip-flop 138 and a selective data access (SDA) flip-flop 139. In addition the previously disclosed circuits adapted to control the gating of representations into and out of the bank 150 of selection registers, and to terminate the selective access mode of operation, are combined in the selection register gating and selective access termination circuit 200 shown in FIG. 1B. In addition, gate units 152 and 158, controlled by the circuit 200, are utilized to route information to and from the registers 150.

Moreover, the various instruction, index, address and associated decorders, registers, counters, and gates that are connected to the storage buffer register 106 are, in the interest of clarity and simplicity of presentation, combined in a single block 205 shown in FIG. 1A. A specific illustrative depiction of how to arrange these various components is shown in FIGS. 1A and 1B of the aforecited U.S. Pat. No. 3,440,618.

Data stored in the register 106 may be applied via a lead 107 to associated conventional components of a computing or data processing system. Also, data may be delivered from these associated components to the register 106 via a lead 107*a*.

In accordance with the principles of the present invention, an information processing system includes a byte-organized main memory unit. Such a unit, designated 210, is shown in FIG. 1A and is represented therein as constituting a plurality of individually addressable sections or modules. Although the unit 210 or portions thereof may be of the read-only type, it is represented for illustrative purposes as being entirely a read-write unit. In other words, information may be read out or written into the memory unit 210 during operation of the depicted processing system. The unit 210 may, for example, be a conventional magnetic core memory adapted to have stored therein at specified address locations a plurality of multidigit binary numbers which may be data representations or instruction words.

Advantageously, each module of the unit 210 comprises a modular building block memory of the type described in "No. 1 ESS Call Store—A 0.2-Megabit Ferrite Sheet Memory," by R. M. Genke, P. A. Harding and R. E. Staehler, *The Bell System Technical Journal*, pages 2147–2191, Sept. 1964.

In general, the main memory unit 210 is organized into *m* separate modules. In the specific system shown in the drawing, the unit includes only four such modules which are designated 210A through 210D. Each module of the memory unit is capable of storing a multiplicity of bytes which herein will each be assumed to comprise eight bits. Hence, a full-word stored in the unit 210 includes four bytes or 32 bits.

The byte-organized main memory unit 210 shown in FIG. 1A is referenced by a plurality of location counters. There is one such counter associated with each different module of the unit 210. Accordingly, the specific depicted system requires four counters, which may be either program instruction location counters or address counters. Four program instruction location counters 215 through 218 are explicitly shown in FIG. 1A and the description hereinbelow will emphasize their interaction with the main memory unit 210. For alternative use, in the so-called selective data access mode of operation, four address counters also capable of referencing specified locations in the unit 210 are included in the block 205.

For illustrative purposes, the bank 150 (FIG. 1B) of selection registers is considered to include 31 registers each capable of storing 16 bits. Moreover, the representations stored in each selection register are assumed to be composed of four bytes each four bits in length. Each such byte is respectively associated with one of the program instruction location counters 215 through 218 and, as will be described in detail later below, is utilized to selectively control (increment) the indication contained in its associated counter.

The transferral of bytes from a specified selection register to the program instruction location counter 215 through 218 takes place via a gate unit 220. In turn, the representations stored in the counters 215 through 218 are applied to the store access decoder 102 through a gate unit 225.

The mode of operation of the previously described components shown in FIGS. 1A and 1B is set forth in the aforecited patents. In this connection, it is noted, for example, that the significance of the designations T (ALL MODES), T-SDA-RESET and T-SDA-SET associated with certain leads shown in the drawing of the present illustrative system, is specified in the paragraph that bridges columns 5 and 6 of the U.S. Pat. No. 3,440,618. Complete details concerning initiation, execution, and termination of the selective access mode are contained in the cited disclosures. Accordingly, attention below is directed mainly to the arrangement and capabilities of those components (such as, for example, the byte-organized main memory unit 210 and the plural program instruction location counters 215 through 218) which have been added to a selective access system as heretofore configured to replace the word-organized memory and the single location counter included therein. When read in the light of the previously cited disclosures, the explanation below will constitute a clear and complete basis for understanding the operating mode and overall structural arrangement of the present invention. (Hereinafter the term "previously disclosed" is to be understood to refer to the combined disclosures of the aforecited patents.)

Assume that a TSA- or ESA-type instruction of the kind previously disclosed is to be executed by the illustrative system shown in the drawing. In response to the retrieval and decoding of such an instruction, the selection tag counter 172 is set to the value given in the TSA or ESA instruction. In addition, the program instruction location counters 215 through 218 are thereby set (by signals applied thereto via lead 219) either to the word address given in the instruction or else to the word address of the location immediately following the instruction (for in-line execution). In addition, the selective access mode flip-flop 134 is thereby set. Before the next machine cycle commences, the contents of the particular selection register in the bank 150 which is referenced by the counter 172 are gated under control of the circuits 132 and 200 to the four location counters 215 through 218. These counters are thus incremented by the four different (in general) byte fields of the referenced selection register. At the beginning of the next machine cycle, the bytes of the main memory unit 210 which are respectively referenced by the corresponding program instruction location counters, are gated, under control of the store access decoder 102, to their respective destinations in the storage buffer register 106. The instruction so composed is then executed, as previously disclosed. (In the case of half-word or one-byte instructions, all of those accessed are executed.)

Meanwhile, the tag counter 172 is incremented by one and the contents of the next referenced selection register are gated to the program instruction location counters 215 through 218 before the beginning of the next cycle.

Selective access is terminated either (1) when a selection register containing only zeros is referenced or (2) when the tag counter 172 is incremented to zero (from its highest value) or (3) when a termination option is decoded in an executed instruction while selective access is in effect. Only one of these options is needed in any implementation, though all may be included. For illustrative purposes, option (1) will be assumed later below.

Termination of the selective access mode of operation may result in any of the various alternative actions previously disclosed. Moreover, loading and storing of selection registers, next-selection-register techniques and other previously disclosed alternatives can be embodied in the depicted system in a straightforward way. For example, bit-mode or tally encoding can be included in the illustrative system by having the circuit 200 apply to the location counters 215 through 218 the next four tallies found in a long selection register. Advantageously, such tallies would be separated by zeros. Thus a tally sequence of 10.0.1110.110 (periods put in for clarity) would cause the four counters 215 through 218 to be incremented by 1, 0, 3, and 2, respectively. Tally encoding may be useful where increments are small but varied.

As mentioned earlier, plural address counters identical in configuration to the program instruction location counters 215 through 218 are included in the block 205 and are effective, when the SDA mode flip-flop 139 is set, to select data from the byte-organized unit 210 just as instructions are selected as described herein.

The operation of an illustrative processing system made in accordance with the principles of the present invention will be better understood by describing in detail a particular example that the system is adapted to carry out. The example will involve the accessing and retrieval of instructions from the main memory unit 210. But it will be apparent that an example involving the selective retrieval of data words could just as well have been chosen.

Consider, for example, the byte-organized general routine represented in FIG. 3. As shown, the routine comprises 18 words having at the most four bytes each. These words are stored in the plural-module main memory unit 210 at address locations designated THME through THME + 17. (Instead of showing the actual binary digits that occupy each byte position, symbolic equivalents are employed in FIG. 3 for greater clarity.)

The bytes stored in the module 210A at the locations THME through THME + 6 (FIG. 3) comprise operation codes. The bytes stored in the module 210B at the locations THME through THME + 13 are each representative of an index tag or a count. The third and fourth modules 210C and 210D contain operations, counts, masks, tags or addresses. The quantities stored in 210C and 210D at THME through THME + 4 and at THME + 9 through THME + 17 each require two adjacent byte positions for storing the binary components thereof. On the other hand, the quantities stored in the modules 210C and 210D at THME + 5 through THME + 8 each require only a single byte position of storage capacity.

Any of the second byte quantities shown in FIG. 3 (that is those stored in the module 210B) may be combined with any of those in the first byte, and these in turn may be combined with any of those in the third and fourth bytes. For example, the LOAD operation may have a tag of X1, X2, X3 or X4. (In general, the LOAD operation may be combined with any second byte quantity in the depicted routine, but it is assumed herein for illustrative purposes that only the specified tags have meaning for the particular LOAD operation in this example.) The LOAD offset may be, as shown, 1, 3, 7, 8 or 12. (These may, for example, represent distances in words from the head of a stored table.)

Assume, for example, that it is desired to select from the routine of FIG. 3, the particular item-extracting sequence represented in FIG. 4. The FIG. 4 sequence specifies that the eighth word of the table pointed to by register X2 is to be shifted seven places and masked out in all but the positions specified by RIGHT. In turn, the contents of LIMIT are to be subtracted from the masked quantity and the result is to be stored in the QUEUE word of the table pointed to by register X7.

To implement the FIG. 4 sequence in accordance with the principles of the present invention, specified ones of the registers in the bank 150 (FIG. 1B) are loaded with selection information having a predetermined format. Assume, for example, that registers 9 through 13 in the bank 150 are loaded (in any one of the several previously disclosed ways) with the particular quantities represented in FIG. 5. The notation 0, 1, 3, 3, for instance, is representative of the binary sequence 0000000100110011 which is loaded into the four four-byte segments of selection register No. 9.

The contents of selection registers 9 through 13 are applied in sequence via gate unit 220 to the program instruction location counters 215 through 218. In each case, the four, four-byte segments stored in a selection register are respectively applied as incrementing quantities to the counters 215 through 218. Thus, if initially the counters each contain therein an indication representative of the address location THME, application thereto of the 0, 1, 3, 3 sequence stored in selection register No. 9 will cause the counters 215 through 218 to be incremented to the representations THME, THME + 1, THME + 3 and THME + 3, respectively. In turn, the specified contents of the program instruction location counters are gated to the decoder 102 which in response thereto individually accesses the modules 210A through 210D of the main memory unit 210. More specifically, the following bytes in the unit 210 are thereby accessed: the byte LOAD at the address THME in the module 210A, the byte X2 at the address THME + 1 in the module 210B, and the two bytes representative of the number 8 stored at the location THME + 3 in each of the modules 210C and 210D. Hence, the bytes read out of the unit 210 and applied to the storage buffer register 106, via gate units 260 through 263 under control of the decoder 102, constitute the instruction LOAD X2, 8. This instruction is the first one of the set shown in FIG. 4.

At this point in the cycle of operation, with the program instruction location counters 215 through 218 respectively set to the indications THME, THME + 1, THME + 3 and THME + 3, the contents of the next specified selection register (No. 10) are gated to the counters, As seen from FIG. 5, selection register No. 10 contains the representation 1, 5, 2, 4. In response thereto the counters are incremented by the indicated quantities to the representations THME + 1, THME + 6, THME + 5 and THME + 7. The bytes stored at these respective addresses in the modules 210A through 210D are SHIFT, 7, MASK and RIGHT. Accordingly, the bytes applied from the memory unit 210 to the storage buffer register 106 constitute the next two instructions of the sequence shown in FIG. 4. In particular, one half-word, for example the instruction SHIFT 7, is routed to the left-hand half of the register 106 and the other half-word instruction MASK RIGHT is applied to the right-hand section thereof.

By systematically following the procedure set forth above, it is apparent that the next set of increments (3, 4, 6, 4) stored in selection register No. 11 is effective to reference the instruction SUB O, LIMIT (herein LIMIT is a two-byte field). Subsequently, the increments 1, 3, 5, 5 stored in selection register No. 12 are effective to cause the last instruction of the FIG. 4 sequence to be applied to the register 106. Lastly, as previously disclosed, the selective access mode of operation is terminated in response to a determination by the system that selection register No. 13 stores an all-zero word.

Thus, there has been described herein a specific illustrative byte-organized selective access system made in accordance with the principles of the present invention. The main advantage of the described system is exemplified by the fact that the general routine of FIG. 3 is in effect equivalent to a much longer routine that would be needed for selective access with a word-organized memory. For example, a word-organized system would require the storage of 20 different LOAD instructions to match the capability provided herein by a single-LOAD operation code combined with four possible tag codes and five possible integer offsets therefore. Moreover, each of the SHIFT, MASK, ADD and other instruction combinations embodied in the FIG. 3 routine would also require a relatively large number of different instruction sets in a word-organized system to achieve the same capability as the system described herein. This advantageous saving in storage space is even more pronounced when the herein-described system is compared with a conventional system in which, for example, it may be necessary to have a distinct subroutine for carrying out each one of a large number of similar tasks.

It is noted that the number of selection bits required to select an instruction must be less than the number of bits in the instruction itself, in order to achieve the aforementioned saving in space. In the illustrative system, 16 bits of information are used to select 32 bits of instruction information. The saving is therefore at most 50 percent (or in general, the ratio of selection information to instruction information). The actual saving will be somewhat less, due to an overhead attributable to the general routine. For example, if 100 different sequences averaging the equivalent of four full-word instructions each were extracted from the FIG. 3 routine, then the overhead attributable to the 18 word general routine would be 18/400, or 4½ percent. The net saving would then be about 45 percent. Clearly, the more a given general routine is used, the less this overhead comes to. The system is particularly effective when the general routines are designed to be used frequently.

It is one of the constraints on the system that selection information must be compact. This means that having large selection bytes for large increments to the location counters would be inefficient. But this is not a serious disadvantage: The whole point of the system is to make it possible to write compact generalized routines. The example in FIGS. 3 and 4 shows it is possible to write a generalized routine that can usefully be selected from using four-bit selection bytes. A guide to designing systems of this kind is to compact the routine code in the way intended, in order to get along with minimal selection information (in the form of small location counter increments). A three-bit field should even be feasible with careful general routine design, as can be seen from the example. Also, as mentioned earlier above, variable-length encodings of selection information will help in the case of widely varying distributions of increment amounts. For improved performance, the ratio of selection information to instruction information should be reduced well below 50 percent.

It is also noted that fast multiple load instructions of the kind used in previously disclosed selective access systems can be used to advantage to reduce the time needed to load blocks of selection information from main memory to selection registers. Since selection tables are contiguous, overlapped loading is possible.

With systems of the illustrated type it is also possible to save processing time by taking advantage of the smaller memory size required. The smaller memory can typically be faster than the larger one needed with prior art arrangements at the same cost in components and complexity.

It will be understood that the above-described arrangements are only illustrative of the application of the principles of the present invention. In accordance with these principles, numerous other arrangements may be devised by those skilled in the art without departing from the spirit and scope of the invention. For example, the main memory unit 210 may include any desired number of modules. Also, the bit capacity per word stored in each module and the number of bytes per module can be varied. In addition, different size combinations can be used in the same system. For instance, each memory module can be its own unique size (number of bytes) and have its own unique byte size (number of bits per byte). Further, each module location counter can be its own unique size and the associated selection field therefore can be a unique length. Also, the herein-described fixed one-to-one relationship between the location counters 215 through 218 and the modules 210A through 210D can be varied as desired by interposing a module address counter and a switching arrangement between the counters and the modules. In that way the representation stored in a particular location counter can be associated with any selected one of the memory modules.

I claim:

1. In combination in an information processing system,
memory means for storing words at specified locations,
location counter means connected to said memory means for referencing words stored in said memory means,
means for controlling the stepping of said counter means, without reference to said memory means, to determine the amount of such stepping,
and program-variable means registering a coded compact data representation which is independent of said words but completely definitive of which of said stored words are to be selected for accessing, said program-variable means being connected to said means for controlling for specifying whether said counter means is to be stepped or not and, in the event that stepping is indicated, the amount of such stepping,
whereby these controlling and stepping actions consume a sufficiently small portion of a cycle of said system to allow for the accessing and retrieval of the word referenced by said counter means in the balance of the system cycle,
wherein the improvement comprises said memory means comprising a plural-module byte-organized memory unit,
said location counter means comprising plural location counters respectively connected to the modules of said memory means,
and said means for controlling comprising means responsive to said program-variable means for respectively applying fixed- or variable-length bytes of selection information to said location counters for simultaneously modifying the representations contained therein by individual and independent amounts.

* * * * *